Sept. 10, 1957
O. M. STUETZER
2,806,115
ELECTRIC REGULATOR
Filed April 2, 1956
FIG. 1
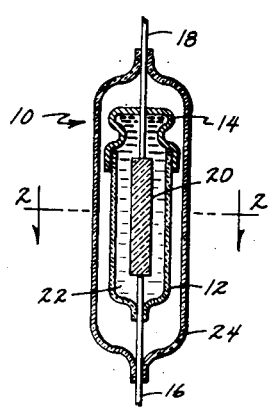
FIG. 3
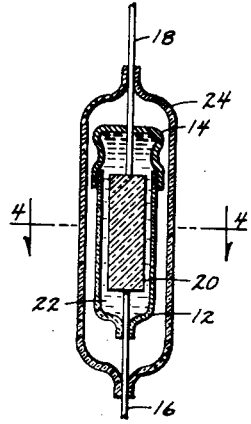
FIG. 2
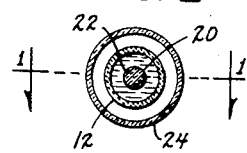
FIG. 4
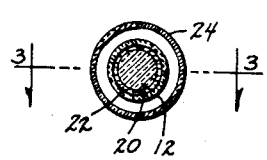
FIG. 6
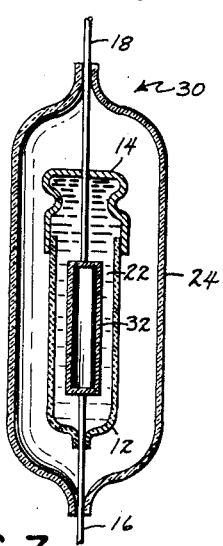
FIG. 8
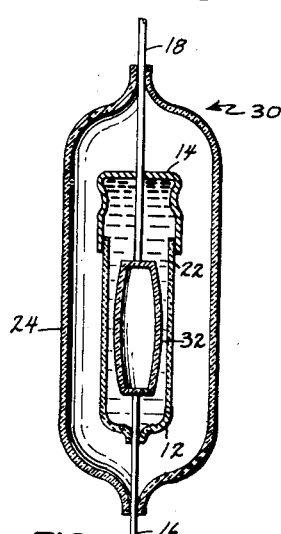
FIG. 5
FIG. 7
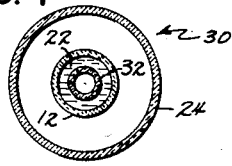
FIG. 9
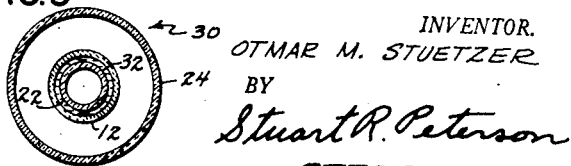
INVENTOR.
OTMAR M. STUETZER
BY
Stuart R. Peterson
ATTORNEY

United States Patent Office 2,806,115
Patented Sept. 10, 1957

2,806,115

ELECTRIC REGULATOR

Otmar M. Stuetzer, Hopkins, Minn., assignor to General Mills, Inc., a corporation of Delaware Application April 2, 1956, Serial No. 575,551

13 Claims. (Cl. 201—57)

This invention relates to electric voltage or current regulators and pertains more particularly to a regulator of this character operable on a thermal principle.

One important object of the invention is to provide a thermally operable regulator which will be completely continuous in its function, thereby avoiding the more abrupt changes that have occurred in the past with regulators of the non-continuous type. More specifically, it is envisaged that the regulator forming the subject matter of the instant invention will be completely smooth in its operation in contradistinction to the commonly used relay type which of necessity must operate in incremental steps.

Another object of the invention is to provide a regulator that will be exceedingly compact, thereby encouraging its use in locations where only a small amount of space is available. In this regard, it may be explained that my regulator does not possess the bulkiness of conventional graphite pressure regulators.

Another object of the invention is to provide a regulator that is very rugged, being able to withstand sudden shocks and prolonged periods of vibration. Thus, the invention has a decided advantage over ordinary ballast tubes.

A further object of the invention is to provide a regulator that will be unaffected by its particular position, thereby permitting it to be employed at various angles. For instance, the instant regulator may be mounted in a vertical, horizontal or inverted position.

Still another object of the invention is to provide a regulator that will be unaffected by dirt and other foreign matter.

Yet another object of the invention resides in the producing of a regulator that will be exceptionally long lasting, requiring no replacement of parts as long as it is subjected to normal usage.

A still further object of the invention is to provide a regulator of the foregoing nature which is quite versatile in its operation, the design thereof permitting it to be adapted for the regulation of electric current versus temperature or voltage versus temperature. Further, it is contemplated that by the addition of a thermal shield the regulator may be used as a constant current device, or if desired, a constant voltage device.

Another object of the invention is to provide a regulator that can handle relatively large amounts of power, especially for its size, and also one requiring very little power for effecting the desired regulation.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

Figure 1 is a sectional view in elevation depicting the regulator as it would be designed for the realization of a constant current operation, the view being taken in the direction of line 1—1 of Fig. 2;

Fig. 2 is a sectional view taken in the direction of line 2—2 of Fig. 1;

Fig. 3 is a view corresponding to Fig. 1 but showing the regulator having a constricted relation of its parts as would be the situation when the current tends to increase above a predetermined value, this view being in the direction of line 3—3 of Fig. 4;

Fig. 4 is a sectional view taken in the direction of line 4—4 of Fig. 3;

Fig. 5 is a sectional view corresponding in essence to Figs. 2 and 4 but illustrating a modified version of the regulator, this embodiment being when the regulator is designed for the constant control of voltage in contradistinction to the constant control of current as in the earlier figures;

Figs. 6, 7, 8, and 9 are views resembling Figs. 1, 2, 3, and 4, respectively, but picturing a different construction the invention may assume in the achieving of constant current regulation.

Referring in detail now to Figs. 1 and 2, the constant current regulator there depicted has been designated in its entirety by the reference numeral 10 and for the purpose of explaining the various features associated with the invention it should be explained that the relative positions of the various parts constituting the embodiment 10 as illustrated in Figs. 1 and 2 are in a cool or unheated condition. Describing the construction of the regulator 10, it will be observed that the regulator includes a container 12 made of a material having a relatively low thermal coefficient of expansion such as quartz which has a coefficient of $3 \times 10^{-7}$ per °C. For a purpose presently to be made manifest, the upper end of the quartz container is equipped with a readily expandable bellows element 14 of thin gauge metal having a sealed connection with the container. The lower end of the container 12 is of reduced dimensions and is suitably cemented directly to one electrode 16 whereas the bellows 14 is similarly cemented directly to a second electrode 18. Within the container 12 is disposed an elongated rod 20 made of a material having a relatively high thermal coefficient of expansion such as soft glass or crystalline magnesium oxide, the latter having a coefficient of $150 \times 10^{-7}$ per °C. The rod 20 is of smaller dimensions than the container 12, thus leaving a space between the inner wall of said container and the outer surface of the rod 20. This space is used to house a quantity of mercury labelled 22 (or perhaps a low melting metal such as gallium if the regulator is to operate at slightly elevated temperatures, or if the voltage is quite low, i. e. below, say, one volt, an electrolyte such as a cuprous sulphate solution may be used.) Actually, the mercury or other liquid fills the entire space created by the container 12 and its bellows cap 14, the bellows adjusting itself for an increase in over-all volume of the rod 20 and the mercury 22.

The regulator 10, as hereinbefore stated, is intended to be used for the realization of constant current and therefore the rod 20 has been made from a material which does have a relatively high thermal coefficient of expansion, the reason for which will now be clarified. In its cooled or unheated state, the annular space existing between the rod 20 and the inner wall of the casing 12 is of larger dimensions than when the rod 20 has expanded somewhat owing to the passage of current through the electrodes 16 and 18 via the intervening mercury 22. The current will produce a certain amount of heat for a given value thereof and thus cause the rod 20 to expand into the position depicted in Figs. 3 and 4. Here, a close examination of Fig. 4 will reveal that the annular space between the rod 20 and the inner wall of the container 12 has been diminished to the extent that it is barely noticeable, some of the annular space now being occupied by the enlarged rod 20. It is, of course, the electrical resistance of the mercury to the flow of current therethrough that generates the heat that results in the expansion of the rod 20. However, reduction of the annular space, and the concomitant constricted cross-section of the mercury occupying this space increases the resistance of the mercury and hence will cut down the amount of current thereby reducing the heat generated therefrom. Any reduction in heat results in a cooling of the rod 20 with a corresponding contraction thereof, thereby increasing the cross-section area of the mercury once again. Thus, the resistance of the mercury is varied in a manner so as to maintain the current at a desired value, for if the current tends to increase, there is an automatic increase in resistance and vice versa.

A very desirable refinement that may be incorporated into the embodiment pictured in Figs. 1–4 is the utilization of a heat shield 24. This heat shield does not have to be of elaborate construction but as illustrated it may consist of an evacuated envelope suitably mirrored with a reflective coating on its inside surface. It is most desirable that all heat affecting the rod 20 stem from the flow of current through the mercury 22, and that no heat be added to this rod from an external source. It is through the agency of this heat shield 24 that such thermal action is prevented, thereby causing the heat passing into the rod 20 to come almost exclusively from the heat generated by the electric current.

While the above embodiment 10 has been designed for use as a constant current regulator, it should be explained at this time that the invention is susceptible to modification so as to produce a constant voltage regulator operation. In this regard, attention is now directed to Fig. 5 presenting an embodiment designated in its entirety by the numeral 28 in which the heat shield 24 may be the same as set forth above. However, the materials used in the making of the container 12 and the rod 20 are simply reversed. In the present instance, the container 12, which we will distinguish from the earlier described container by the addition of the subscript "a," is the element having a relatively high coefficient of expansion such as soft glass and the rod contained therein is the element having a relatively low coefficient of expansion such as quartz. From Fig. 5 it will be discerned that when current is flowing through the mercury contained in the annular space between the elements 12a and 20a, the heat generated therefrom will cause the container 12a to expand and the annular space will increase to dimensions corresponding to those depicted in Fig. 5. Thus instead of a reduction in the annular space as illustrated in Fig. 4, the embodiment of Fig. 5 results in an increase in such space and hence the magnitude of voltage is controlled, for if the voltage impressed on the electrodes 14, 16 tends to rise, more current will be forced through the mercury 22 with the consequence that the added heat resulting therefrom will cause expansion of the container 20a. This increases the cross-sectional area of the mercury and reduces the resistance. The lowered resistance of course reduces the applied voltage. Just the opposite happens upon a voltage decrease.

In Figs. 6–9 a still different embodiment, denoted generally by the numeral 30, is pictured. Here again, the heat shield 24 may be the same as in the earlier described embodiment. Also, the container 12 together with its attached bellows 14 can be identical to the other embodiments 10 and 28. The real difference here is in the construction of the expansible member contained within the container 12 of this embodiment 30. As can be seen from Figs. 6 and 7 the expansible member has the form of a cylinder 32 having a hollow interior. The cylinder 32, as was the rod 20, may be of soft glass, thereby imparting a relatively high coefficient of expansion to this element. However, the use of a hollow cylinder as shown in Fig. 6 permits the use of a gas such as helium or hydrogen which fills the interior of the cylinder 32. Hence not only do the relatively thin walls of the cylinder 32 permit a more rapid expansion but the continued passage of heat through the walls of the cylinder 32 from the current coursing through the mercury 22 will tend to cause expansion of the gas contained within this cylinder. Consequently the confined gas acts pressurally outward in a direction to assist the expansible action of the cylinder 32 so as to control even more rapidly the annular space existing between the container 12 and the cylinder 32. The pressure developed by the gas can actually be caused to be of such magnitude so as to cause a bulging out of the cylinder walls as is depicted in somewhat of an exaggerated form in Fig. 8. It can be appreciated by considering both Figs. 8 and 9 that the spacing existing between the container 12 and the cylinder 32 is minimized more rapidly by using a gas-filled cylinder.

It is also within the purview of the invention to utilize a material for the cylinder 32 that is not so thermally expansive as the soft glass, then relying upon the expansibility of the gas itself to force the cylinder's side walls out with the relationship shown in Figs. 8 and 9. Hexafluorine plastics have proved entirely satisfactory in this modification, Teflon which is one such plastic being readily obtainable on the market. However, the walls of the cylinder 32 should be relatively thin in this instance for sensitive operation.

It is felt that the above presentation has been adequate to afford a ready understanding of the benefits to be derived from a practicing of this invention. However, it should be pointed out specifically that the regulators designated by the numerals 10, 28 and 30 need not be oriented in a vertical direction as pictured for they may be turned at practically any angle including a horizontal position. When shifted into a horizontal position, it can readily be appreciated that the rod 20, the rod 20a, and the cylinder 32 will merely rest on the lower side of the container 12. However, as far as the space between these elements of the container 12 is concerned, there will be no change in such area even though the space will no longer be truly annular. It should also be noted that it is preferable that the electrodes 16 and 18 project inwardly a sufficient distance so as to provide support for the various elements 20, 20a, and 32. However, this is not absolutely essential but is of course desirable in order to permit complete freedom as far as relative expansion between these inner elements and their container 12 is concerned.

To render the embodiments 10, 28, and 30 sensitive to temperature, as would be the case when current or voltage is to be controlled in accordance with ambient temperature changes, the heat shield 24 is simply omitted. By omitting the heat shield 24 both the container 12 and the container 12a are exposed to the surrounding temperature. In the case of the embodiment denoted by the numeral 28 the container 12a will expand or contract in accordance with experienced temperature changes to thereby regulate the voltage in relation to temperature, whereas in the regulation of current versus temperature the heat will be transmitted to the elements 20 and 32 (embodiments 10 and 30, respectively) via their containers 12 and their associated bellows 14.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. An electrical regulator of the class described comprising a container of electrical insulating material having a preferred thermal coefficient of expansion, an electrode element entering spaced portions of the container, a member of electrical insulating material disposed within the container having a thermal coefficient of expansion different from said container, said elongated member being of smaller dimensions than the interior of said container thereby to provide space within said container, and a fluid in said space capable of conducting an electrical current, whereby relative thermal expansion of said container and elongated member owing to the difference in coefficients thereof will change the cross-section of said fluid and hence modify its resistance to the passage of electric current therethrough.

2. An electrical regulator in accordance with claim 1 in which said container includes a bellows portion.

3. An electrical regulator in accordance with claim 1 in which said fluid is mercury.

4. An electrical regulator in accordance with claim 1 including a thermal shield encasing said container.

5. An electrical regulator in accordance with claim 4 in which said shield is an evacuated glass envelope having a heat reflecting coating on its inner surface.

6. An electrical regulator of the class described comprising an elongated container of electrical insulating material having a relatively low thermal coefficient of expansion, an electrode element entering each end of the container, an elongated member of electrical insulating material having a relatively high thermal coefficient of expansion disposed within said container, said elongated member in an unheated condition being of smaller dimensions than the interior of said container thereby to provide space within said container, and a liquid in said space capable of conducting an electrical current, whereby thermal expansion of said elongated member will reduce the cross-section of said liquid and hence modify its resistance to the passage of electric current therethrough.

7. An electrical regulator in accordance with claim 6 in which said container is quartz, said elongated member is soft glass and said liquid is mercury.

8. An electrical regulator of the class described comprising an elongated container of electrical insulating material having a relatively high thermal coefficient of expansion, an electrode element entering each end of the container, an elongated member of electrical insulating material having a relatively low thermal coefficient of expansion disposed within said container, the interior of said container in an unheated condition being of larger dimensions than said elongated member thereby to provide space within said container, and a liquid in said space capable of conducting an electrical current, whereby thermal expansion of said container will increase the cross-section of said liquid and hence modify its resistance to the passage of electric current therethrough.

9. An electrical regulator in accordance with claim 8 in which said container is soft glass, said elongated member is quartz and said liquid is mercury.

10. An electrical regulator of the class described comprising an elongated container of electrical insulating material having a relatively low thermal coefficient of expansion, an electrode element entering each end of the container, a hollow cylindrical member of electrical insulating material having a relatively high thermal coefficient of expansion disposed within said container, said cylindrical member in an unheated condition being of smaller dimensions than the interior of said container thereby to provide space within said container, and a liquid in said space capable of conducting an electrical current, whereby thermal expansion of said elongated member will reduce the cross-section of said liquid and hence modify its resistance to the passage of electric current therethrough.

11. An electrical regulator in accordance with claim 10 in which said cylindrical member contains a thermally expansible gas.

12. An electrical regulator of the class described comprising an elongated container of electrical insulating material having a given thermal coefficient of expansion, an electrode element entering each end of the container, an elongated cylindrical member of electrical insulating material containing a thermally expansible gas, said cylindrical member normally being of smaller dimensions than the interior of said container thereby to provide space within said container, and a liquid in said space capable of conducting an electrical current, whereby thermal expansion of said gas will cause expansion of said cylindrical member and hence modify the resistance of said liquid to the passage of electric current therethrough.

13. An electrical regulator in accordance with claim 12 in which said cylindrical member is a hexafluorine plastic.

No references cited.